US008560418B2

(12) United States Patent
Zagara et al.

(10) Patent No.: US 8,560,418 B2
(45) Date of Patent: *Oct. 15, 2013

(54) VISUAL REPRESENTATION AND CONFIGURATION FOR TRADING STRATEGIES

(71) Applicant: Trading Technologies International, Inc., Chicago, IL (US)

(72) Inventors: Thomas R. Zagara, LaGrange, IL (US); Michael J. Burns, Riverside, IL (US); Scott F. Singer, Lake Bluff, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/737,505

(22) Filed: Jan. 9, 2013

(65) Prior Publication Data

US 2013/0132257 A1    May 23, 2013

Related U.S. Application Data

(63) Continuation of application No. 13/461,743, filed on May 1, 2012, which is a continuation of application No. 12/903,983, filed on Oct. 13, 2010, now Pat. No. 8,195,545, which is a continuation of application No. 12/477,086, filed on Jun. 2, 2009, now Pat. No. 7,835,964, which is a continuation of application No. 11/415,381, filed on May 1, 2006, now Pat. No. 7,558,750, which is a continuation of application No. 11/095,101, filed on Mar. 31, 2005, now Pat. No. 7,590,576.

(51) Int. Cl.
*G06Q 40/00* (2012.01)

(52) U.S. Cl.
USPC .......................................................... 705/35

(58) Field of Classification Search
USPC ............................................................ 705/35
See application file for complete search history.

(56) References Cited

U.S. PATENT DOCUMENTS

| 6,772,132 | B1 | 8/2004 | Kemp, II et al. |
| 7,127,424 | B2 | 10/2006 | Kemp, II et al. |
| 7,181,405 | B1 | 2/2007 | Sako |
| 7,219,076 | B1 * | 5/2007 | Racine ....................... 705/26.62 |
| 7,251,629 | B1 * | 7/2007 | Marynowski et al. .......... 705/37 |

(Continued)

OTHER PUBLICATIONS

Anonymous; "ILOG Software Components Help ARINC Achieve Breakthrough in Telecom Application Development"; Business Wire, New York; May 10, 1999.*

(Continued)

*Primary Examiner* — Virpi Kanervo
(74) *Attorney, Agent, or Firm* — McDonnell Boehnen Hulbert & Berghoff LLP

(57) ABSTRACT

A system and method are provided to visually represent and configure trading strategies used in electronic trading. The system and method may be used to visually represent, among other things, an acceptable range of prices for a trading strategy in relation to a graphical user interface. The acceptable range of prices may be input by a trader to limit when one or more orders are moved from one price to another. The acceptable range of prices can be displayed on a graphical user interface using visual indicators. Using the visual indicators, the acceptable range of prices can also be configured and modified by a trader based on the trader's preferences. Other features and advantages are described herein.

22 Claims, 11 Drawing Sheets

(56) References Cited

U.S. PATENT DOCUMENTS

| | | |
|---|---|---|
| 7,299,208 B1 | 11/2007 | Bailon et al. |
| 7,350,146 B2 | 3/2008 | Moran et al. |
| 7,389,268 B1 | 6/2008 | Kemp, II et al. |
| 7,437,325 B2 | 10/2008 | Kemp, II et al. |
| 7,483,871 B2 | 1/2009 | Herz |
| 7,558,750 B1 | 7/2009 | Zagara et al. |
| 7,590,576 B1 | 9/2009 | Zagara et al. |
| 7,761,388 B2 | 7/2010 | Chitaley et al. |
| 7,835,964 B1 | 11/2010 | Zagara et al. |
| 7,904,370 B2 | 3/2011 | Singer et al. |
| 8,073,761 B2 | 12/2011 | Bjornson et al. |
| 8,195,545 B2 | 6/2012 | Zagara et al. |
| 2002/0194114 A1 | 12/2002 | Erdmier |
| 2003/0009411 A1* | 1/2003 | Ram et al. .............. 705/37 |
| 2003/0037041 A1 | 2/2003 | Hertz |
| 2003/0083941 A1 | 5/2003 | Moran et al. |
| 2003/0195822 A1 | 10/2003 | Tatge et al. |
| 2003/0236737 A1 | 12/2003 | Kemp, II et al. |
| 2004/0103127 A1 | 5/2004 | Bjornson et al. |
| 2004/0193526 A1 | 9/2004 | Singer et al. |
| 2004/0230493 A1 | 11/2004 | Tatge et al. |
| 2004/0236637 A1 | 11/2004 | Tatge et al. |
| 2004/0254870 A1 | 12/2004 | Chitaley et al. |
| 2005/0108141 A1 | 5/2005 | Farrell et al. |
| 2005/0203826 A1 | 9/2005 | Farrell et al. |
| 2005/0228740 A1 | 10/2005 | Chang et al. |
| 2006/0015375 A1 | 1/2006 | Lee et al. |
| 2012/0215679 A1 | 8/2012 | Zagara et al. |

OTHER PUBLICATIONS

Breedvel, Paulus; "The Design of a Man-Machine interface for a Space Manipulator"; Technische Universitet Delphi (The Neatherlands), Dissertations Publishing (Abstract) (1996).*

Sharp, Bill; "Can Windows Really Make the AS/400 Friendly?"; Datamation; vol. 38, Iss. 23, p. 85; (Abstract) (1992).*

Anderson, H., "E*Trade Upgrades Trading Package: Offers Active Investor Technical Analysis, Real-Time Quotes" [online], *National Post*, Don Mills, Ontario: Jun. 13, 2000, p. D.1.FRO. [Retrieved on May 22, 2012] from the Internet: http://proquest.umi.com/, ProQuest Document ID: 248499171.

Anonymous, CNX Futures (Abstract) [online], Businessline, Chennai: Apr. 18, 2004, p. 1. [Retrieved on Jan. 18, 2012] from the Internet: http://proquest.umi.com/, ProQuest Document ID: 62124001.

Grubbstrom, R.W. and Kingsman, B.G., "Ordering and Inventory Policies for Step Changes in the Unit Item Cost: A Discounted Cash Flow Approach," *Management Science*, vol. 50, No. 2, Feb. 2004, pp. 253-267.

Kuhn, F., "Easily Compare Multiple Stock Attributes at Once Using Excel Charts" [online], *Inside Microsoft Excel*, Louisville: Jul. 2004, vol. 11, Iss. 7, p. 6 (3 pages). [Retrieved on May 22, 2012] from the Internet: on http://proquest.umi.com/, ProQuest Document ID: 653336451.

Matassini, L. and Franci, F., "On Financial Markets Trading" (Abstract) [online], *Physica A*, vol. 289, Iss. 3-4, Jan. 15, 2001, pp. 526-542. [Retrieved on Jan. 18, 2012] from the Internet: http://proquest.umi.com/, ProQuest Document ID: 831513979.

McNicholl, D., "Old Statistical Methods for New Tricks in Analysis" [online], *Futures*, Chicago: Apr. 2002, vol. 31, Iss: 5, p. 30-32. [Retrieved on Jan. 18, 2012] from the Internet: http://proquest.umi.com/, ProQuest Document ID: 112832112.

Nematnejad, A., "The TED Spread Trade: Illustration of the Analytics Using Bloomberg," *YieldCurve.com*, 2003, pp. 1-10.

Owens, E., "Yield-boosting Strategy Immune to Rate Hikes", *Corporate Cashflow*, vol. 16, No. 1, Jan. 1995, pp. 19-21.

Sepiashvii, D., "Price Bands that Go with the Flow" [online], *Futures*, Chicago: Oct. 2004, vol. 33, Iss. 13, p. 34 (4 pages). [Retrieved on May 22, 2012] from the Internet: http://proquest.umi.com/, ProQuest Document ID: 706785741.

Webb, A., "Trading the New-Fashioned Way," Trading & Exchanges, *Wall Street & Technology*, vol. 21, No. 9, Sep. 2003, p. 27.

"What's an Emulator Cost? What's it Worth?", *Computer Design*, vol. 33, Jun. 1994, pp. 105-112.

Wilfong, G.T., "Graphs With Variable Edge Costs: A Method for Scheduling a Vehicle Subject to Speed and Timing Constraints," *IEEE*, vol. 1, Jul. 1990, 73-79.

* cited by examiner

VISUAL REPRESENTATION AND CONFIGURATION FOR TRADING STRATEGIES

CROSS-REFERENCE TO RELATED APPLICATIONS

This application is a continuation of U.S. patent application Ser. No. 13/461,743 filed May 1, 2012, now U.S. Pat. No. 8,423,442, which claims the benefit of U.S. patent application Ser. No. 12/903,983 filed Oct. 13, 2010, now U.S. Pat. No. 8,195,545, which claims the benefit of U.S. patent application Ser. No. 12/477,086 filed Jun. 2, 2009, now U.S. Pat. No. 7,835,964, which claims the benefit of U.S. patent application Ser. No. 11/415,381, filed May 1, 2006, now U.S. Pat. No. 7,558,750, which claims the benefit of U.S. patent application Ser. No. 11/095,101 filed Mar. 31, 2005, now U.S. Pat. No. 7,590,576, the contents of which are fully incorporated herein by reference.

FIELD OF INVENTION

The present invention is directed towards electronic trading. Specifically, the present invention is directed to tools for trading products that can be traded with quantities and/or prices.

BACKGROUND

Electronic trading includes a host exchange that has a central computer in which bids and offers are received and executed, if a match exists between them. The host exchange provides a summary of the bids and offers for viewing by those traders that have access to the system. The traders can monitor their screens and freely enter bids or offers, which are then communicated to the host exchange.

The host exchange generally offers many tradeable objects to trade. As used herein, the term "tradeable object," refers simply to anything that can be traded with a quantity and/or price. It includes, but is not limited to, all types of tradeable events, goods, and financial products. For instance, stocks, options, bonds, futures, currency, and warrants, as well as funds, derivatives and collections of the foregoing, and all types of commodities, such as grains, energy, and metals may be considered tradeable objects. A tradeable object may be "real," such as products that are listed by an exchange for trading, or "synthetic," such as a combination of real products that is created by the user. A tradeable object could actually be a combination of other tradeable object, such as a class of tradeable objects.

For each tradeable object, the host exchange generally provides information to interested parties on how the tradeable object is traded at the exchange. Included in this information are the types of messages that can be communicated with the host exchange. At one level, the host exchange provides information on the message headers, payload, and trailers necessary to interface the exchange. Beyond that, the host exchange provides information on how to open a connection, obtain market information, add an order, change an order, delete an order, close a connection, and so on. The information provided by a host exchange can be as simple or complex as the exchange deems necessary to offer its particular tradeable objects for trade.

Each trading network or trading station is then provided with the same sort of information from the host exchange in its data feed. At each trading station is application software that is run to collect certain pieces of information from this data feed and it is displayed to the trader. From this display, a trader may view this information and make decisions on whether to enter an order, modify an order, or perform some other trading related operation. Sometimes the decisions regarding a trader's particular trading strategy are performed by a computer itself given initial instruction by the trader.

In such an electronic marketplace, it becomes desirable to offer a trading tool that can assist a trader in making trades.

BRIEF DESCRIPTION OF THE DRAWINGS

Many aspects of the present embodiments may be better understood with reference to the following drawings. The components in the drawings are not necessarily to scale, emphasis instead being placed upon illustrating example embodiments.

DETAILED DESCRIPTION

I. Overview

Figure 1:
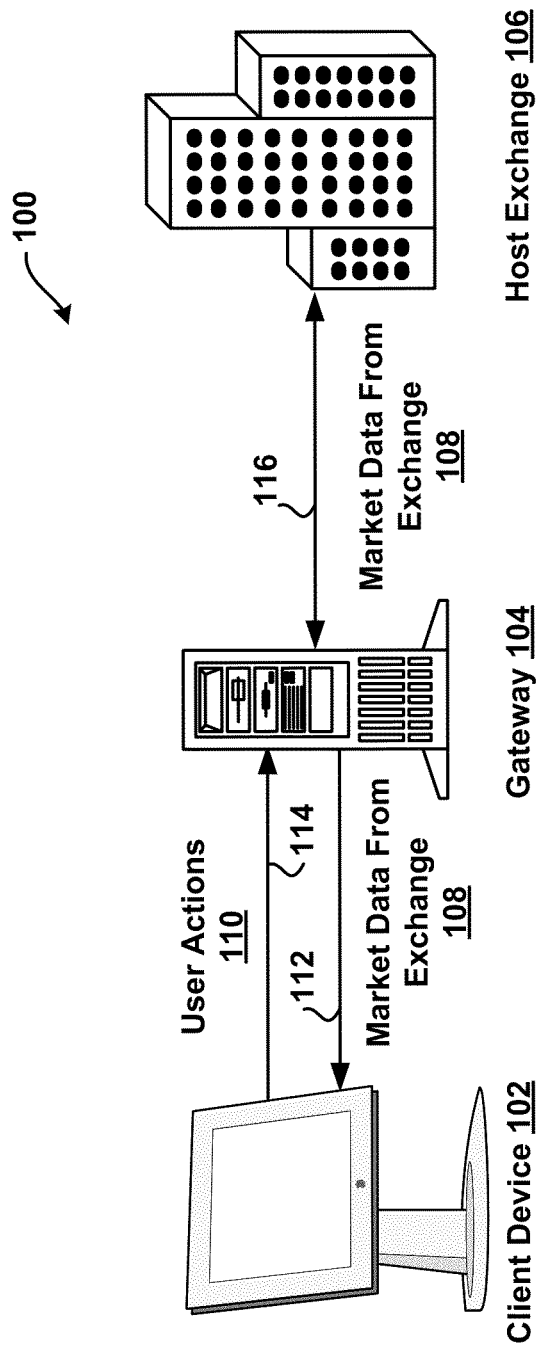
FIG. 1 is a block diagram illustrating an example network configuration for a communication system utilized to access one or more electronic exchanges.

In electronic trading, a trader may trade one or more tradeable objects at any given time. There are all sorts of ways to place orders to buy or sell these tradeable objects. For instance, the trader might place an order through the display screen of a trading station, or the trader might set up an automated trading tool that can enter an order according to the trader's predefined instruction. Regardless of whether the trader manually places the order through her trading station or the computer places the order, the trader may wish to regulate the placement of the order.

There are tools to regulate certain types of order entry. For instance, U.S. patent application Ser. No. 10/137,979, entitled, "System and Method for Performing Automatic Spread Trading," provides a mechanism for regulating order entry, referred to as "slop." Slop, among other things, allows a trader to input certain parameters that are used to determine whether an order should be placed in the market. Building off that concept, U.S. patent application Ser. No. 10/403,333, entitled, "System and Method for Variably Regulating Automatic Order Entry in an Electronic Trading System," provides advanced features to variably regulate the order entry process. While these concepts are described more in the present application, the entire contents of each application, namely application Ser. Nos. 10/137,979 and 10/403,333, are incorporated herein by reference.

Generally, once programmed, trading tools that regulate order entry may often do so with or without the trader's notice of its action. This is because the trader may predefine the parameters in advance of the action actually taking place. The present application describes various example embodiments that can be employed by trading tools, particularly those that use slop or slop-type concepts, to effectively inform the trader as to the current settings of these parameters and why certain actions of the computer may or may not be taking place. The example embodiments may also be used in manual-style trading by effectively assisting the trader in regulating order entry. Regardless of whether the trading tool is manual or automatic in nature, the example embodiments can effectively increase the knowledge and userability of an order regulatory feature found in a trading tool. Additionally, the example embodiments preferably do so without providing unnecessary clutter on the trading screen.

While the example embodiments are described herein with reference to illustrative embodiments for particular applications, it should be understood that the example embodiments are not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the example embodiments may be operated in an entirely software embodiment, in an entirely hardware embodiment, or in a combination thereof. However, for sake of illustration, the example embodiments are described in a software-based embodiment, which is executed on a computer device. As such, the example embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

FIG. 1 is a block diagram illustrating an example system 100 that can be used to facilitate communication between an electronic exchange and a client device. The system 100 includes a client device 102, gateway 104, and host exchange 106. System 100 also includes a plurality of communication links 112, 114, and 116 between the client device 102, gateway 104, and host exchange 106. While FIG. 1 shows two connections between the client device 102 and the gateway 104, it should be understood that a single connection could be used as well. Similarly, one connection could exist between the gateway 104 and the host exchange 106. During a trading session, market data 108, in the form of messages, may be relayed from the host exchange 106 over the communication links 116 and 112 to the client device. As illustrated in FIG. 1, intermediate devices, such as gateway(s) 104, may be used to facilitate communications between the client device 102 and the host exchange 106. It should be understood that while FIG. 1 illustrates the client device 102 communicating with a single host exchange 106, in an alternative embodiment, the client device 102 could establish trading sessions to more than one host exchange.

The market data 108 contains information that characterizes the tradeable object's order book including, among other parameters, order related parameters, such as price and quantity, and the inside market, which represents the lowest sell price (also referred to as the best or lowest ask price), and the highest buy price (also referred to as the best or highest bid price). In some electronic markets, market data may also include market depth, which generally refers to quantities available for trading the tradeable object at certain buy price levels and quantities available for trading the tradeable object at certain sell price levels.

In addition to providing the tradeable object's order book information, electronic exchanges can offer different types of market information such as total traded quantity for each price level, opening price, last traded price, last traded quantity, closing price, or order fill information. It should be understood that market information provided from an electronic exchange could include more or fewer items depending on the type of tradeable object or the type of exchange. Also, it should be understood that the messages provided in the market data 108 may vary in size depending on the content carried by them, and the software at the receiving end may be programmed to understand the messages and to act out certain operations.

A trader may view the information provided from an exchange via one or more specialized trading screens created by software running on the client device 102. Upon viewing the market information or a portion thereof, a trader may wish to take actions, such as send orders to an exchange, cancel orders at the exchange, or change order parameters, for example. To do so, the trader may input various commands or signals into the client device 102. Upon receiving one or more commands or signals from the trader, the client device 102 may generate messages that reflect the actions taken, generally shown at 110. It should be understood that different types of messages or order types can be submitted to the host exchange 106, all of which may be considered various types of transaction information. Once generated, user action messages 110 may be sent from the client device 102 to the host exchange over communication links 114 and 116.

The client device 102 may use software that creates specialized interactive trading screens on the client device 102. The trading screens enable the traders to enter and execute orders, obtain market quotes, and monitor positions while implementing various trading strategies including those previously used on the floor of an exchange. Such strategies incorporated into an electronic marketplace can improve the speed, accuracy, and ultimately the profitability of trading electronically. One such trading strategy is spread trading.

The range and quality of features available to the trader on his or her trading screen varies according to the specific software application being run. In addition to or in place of the interactive trading screens, the client device 102 may run automated non-interactive types of trading applications.

A commercially available trading application that allows a user to trade in environments like those shown in FIG. 1 and subsequent figures is X_TRADER® from Trading Technologies International, Inc. of Chicago, Ill. X_TRADER® also provides an electronic trading interface, referred to as MD Trader™, in which desired orders and bid/ask quantities are displayed in association with a static price axis or scale.

Portions of the X_TRADER® and the MD Trader™-style display are described in U.S. Pat. No. 6,772,132 entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, and U.S. patent application Ser. No. 10/125, 894, entitled "Trading Tools for Electronic Trading," filed on Apr. 19, 2002, the contents of each are incorporated herein by reference. While it may be preferred to employ an MD Trader™ type screen, a person of ordinary skill in the art will recognize that the example embodiments described herein are not limited to any particular type of trading application.

III. Automatic Spread Trading Overview

The example embodiments are described with particular reference to spread trading and trading tools that assist a trader in spread trading. However, as pointed out earlier, the present invention is not limited for use with an automated spread trading tool, but may be applied to any particular trading tool that has an order entry system where limiting the frequency at which orders are placed or re-priced in the market may be beneficial. For instance, another type of trading tool that has an automated order entry system and may benefit using the preferred embodiments is described in U.S. patent application Ser. No. 10/284,584, filed on Oct. 31, 2002 and entitled, "System and Method for Automated Trading," the contents of which are incorporated herein by reference. One skilled in the art may readily adapt the example embodiments to work with this type of automated trading tool, for instance, or some other type of trading tool using the teachings described herein.

To assist in understanding how an automated spread trading tool might work, a general description is provided below. However, an automated spread trading tool and its functions are described in greater detail and may be referenced in an already incorporated U.S. patent application Ser. No. 10/137, 979, filed on May 3, 2002 and entitled, "System and Method for Performing Automatic Spread Trading."

According to the example embodiments, a trader selects the individual tradeable objects underlying the spread, referred to herein as the "legs" of the spread. Generally, a "spread" is the purchase or sale of one or more tradeable objects and an associated purchase or sale of one or more other tradeable objects, in the expectation that the price relationships will change so that subsequent offsetting trades potentially yield a net profit. An automated spread trading application, referred to herein as the automatic spreader, generates spread data based on information in the legs and based on spread setting parameters, which are configurable by the trader. The spread data is communicated to a graphical user interface ("GUI manager" 218) where it is displayed in a spread window. The spread window could also display data related to each leg of the spread. The data related to each leg of the spread may also be displayed in separate windows from the spread window. At the client device, the trader can enter orders in the spread window, and the automatic spreader will automatically work the legs to achieve (or attempt to achieve) the spread. It should be understood that those skilled in the art of trading are familiar with a wide variety of spread trading techniques, and the present embodiments are not limited to any particular type of spread trading technique.

Figure 2:
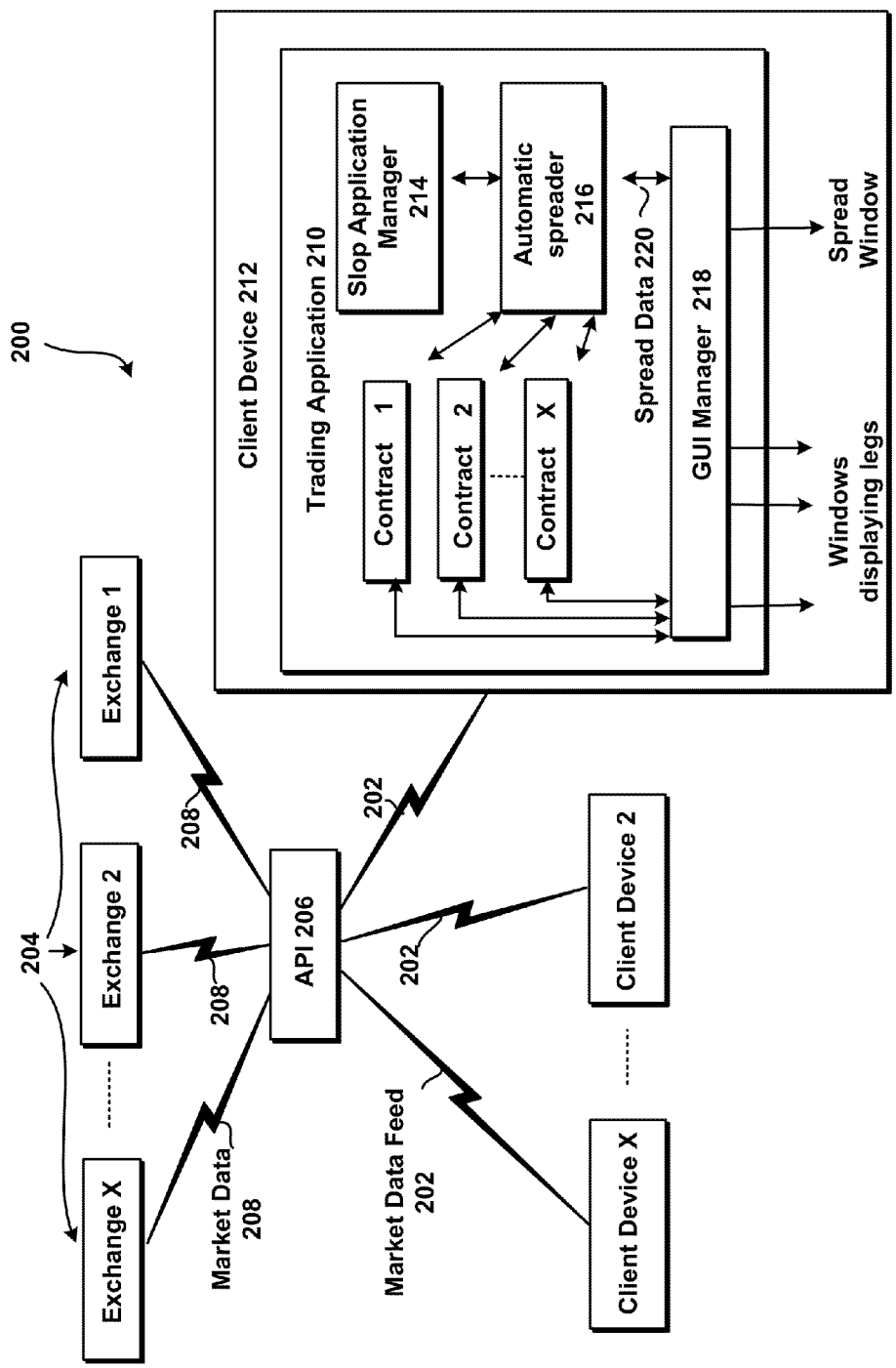
FIG. 2 is a block diagram illustrating a system for facilitating the automatic trading of spreads over the example network shown in FIG. 1 according to an example embodiment.

FIG. 2 is a block diagram illustrating an example system 200 for facilitating the automatic trading of spreads. The system 200 includes an applications program interface ("API") 206 that translates market data 208 for one or more tradeable objects to an appropriate data format, referred to as market data feed(s) 202, which are communicated between the different exchanges and trading applications hosted on the client devices. Client devices may be computing devices such as personal computers, laptop computers, hand-held devices, and so forth. The system 200 preferably supports a plurality of exchanges and client devices.

A client device 212 is shown in more detail to illustrate the interaction between its software and/or hardware components. The client device 212 includes a trading application 210, a slop application manager 214, an automatic spreader 216, and a GUI manager 218. While only four components are shown, it should be understood that the client device 212 could include additional components as well. In one example embodiment, the trading application 210 and the automatic spreader 216 are software applications hosted on the client device 212. Although the automatic spreader 216 is shown together with the trading application 210, it should be understood that the automatic spreader 216 and the trading application 210 may be the same software application or separate software applications on the same or different terminals. Alternatively, the automatic spreader 216 and/or the trading application 210 can be hosted on a server and accessed by the client devices 212 over a network.

In one example embodiment, a trader can configure the automatic spreader 216 to use slop functionality. Slop is used as a means of regulating order entry that can occur in the individual legs of a desired spread order in the automatic spreader 216. Two example types of slop are basic slop and advanced slop, which will be described in greater detail below. The slop application manager 214 can be configured to directly communicate with the automatic spreader 216. Alternatively, the slop application manager 214 could be included in the automatic spreader 216. As will be described in greater detail below, the slop application manager 214 can be configured by the user to have a plurality of inside and outside slop values, also known as the acceptable slop ranges, which are used to determine when a desired spread order should be re-priced in the spread window. The GUI manager 218 is a software application, as shown in FIG. 2, but preferably may work with hardware components such as an input device like a mouse, keyboard, or touch screen, and an output device like a monitor, for example.

In general, as shown in FIG. 2, market data feeds (for tradeable objects) are communicated from the API 206 to the trading application 210 where they are stored and continuously updated (or periodically updated). Using some or all of the market data feeds and the spread setting parameters, the automatic spreader 216 generates spread data 220. The spread data 220 preferably includes spread price, and spread market depth, but may alternatively include other items of interest to the user such as the last traded price (LTP) and the last traded quantity (LTQ). The spread data 220 is communicated to the GUI manager 218 where it can be displayed in a spread window and traded.

Figure 3:
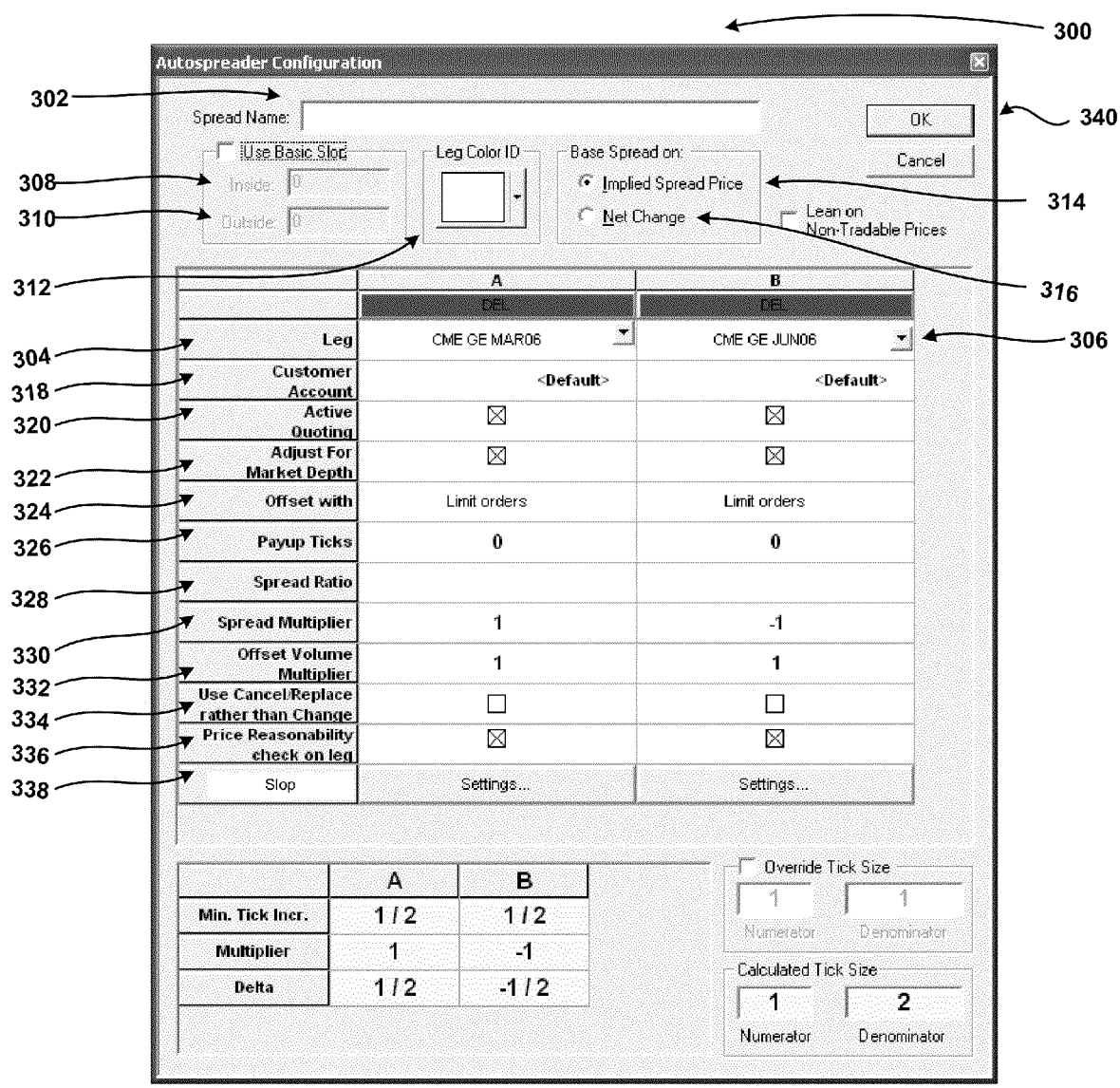
FIG. 3 is a block diagram illustrating an example spread configuration window utilized in accordance with the example system shown in FIG. 2.

Before a trader starts trading, the trader may configure spread parameters to be used by the automatic spreader 216. FIG. 3 is a block diagram illustrating an example spread configuration window 300 that can be used to configure spread parameters for trading spreads. The spread configuration window 300 includes two individual legs 304 and 306 respectively, although any number of legs may be added to the spread configuration window 300. In one example embodiment, the spread configuration window 300 includes many spread parameters that can be set by a trader to customize the spread data feed. As such, the spread parameters may control the behavior of the spread as it is generated and/or displayed and/or traded, depending on the particular parameter. An example list of spread parameters is provided here. The "Spread Name" 302 provides the name of the spread and/or the names of the underlying tradeable objects. Moreover, the names of the legs are displayed in the "Leg" fields 304 and 306. Alternatively, a trader can personalize the spread by renaming the spread and/or legs to have any desired name. Other parameters include "Inside Slop" 308, "Outside Slop" 310, "Leg Color ID" 312, "Implied Spread Price" 314, "Net Change" 316, "Customer Account" 318, "Active Quoting" 320, "Adjust for Market Depth" 322, "Offset with" 324, "Payup Ticks" 326, "Spread Ratio" 328, "Spread Multiplier" 330, "Offset Volume Multiplier" 332, "Use Cancel/Replace rather than Change" 334, "Price Reasonability check on leg" 336, and "Slop" 338. A trader may select "OK" 340 when the spread has been configured to open a spread window and individual leg windows. It will be appreciated by those skilled in the art that the parameters above may be flexible and/or change as circumstances dictate because of the wide range of products that can be traded using the automatic spreader. Moreover, the columns of the spread configuration window 300 can be dragged and dropped such that the user can re-arrange the order of the legs.

IV. Basic Slop Overview

Generally, slop is used as a means of controlling the rate at which the working leg orders on a spread are changed in the outright markets. Slop may be used to avoid excessive quoting that can result in the assessment of transaction fees by certain exchanges. It is also helpful when maintaining a position in the order queue at an electronic exchange. The implementation of slop results in the creation of a price range above and below your desired spread price at which you are willing to be filled. The slop values apply to the spread price and not to the individual leg prices. Basic Slop configuration uses one level of Inside and Outside slop to determine when to re-price the quoted outright legs based upon movement in the market.

The inside and outside slop values are understood to be the acceptable price range set by the trader. The inside slop value generally defines the worst prices (the highest in the case of the spread bid and the lowest in the case of a spread offer) a trader is willing to accept for a spread, and the outside slop generally defines the best price (the lowest in the case of a spread bid and the highest in the case of a spread offer) the trader is willing to accept for a spread. A slop value of 0 indicates that the legs will be re-quoted every time the market prices in the individual legs move. The larger the slop value, the larger the slop range will be. Larger slop values allow for more market fluctuation before the automatic spreader re-quotes the legs.

i) Basic Slop Example

Figure 4:
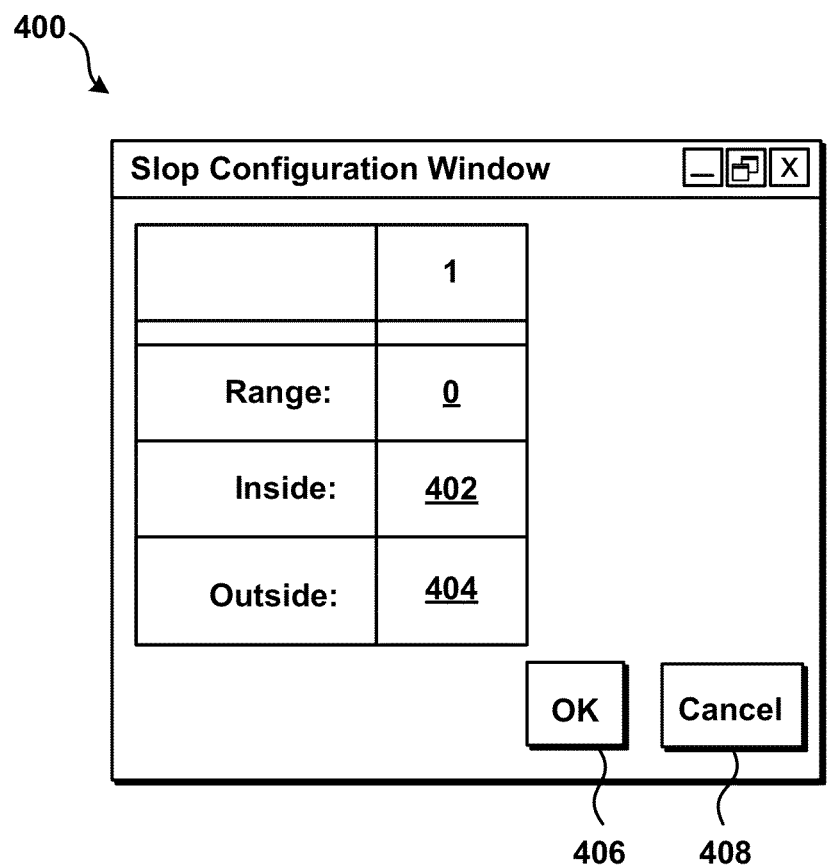
FIG. 4 is a block diagram illustrating an example basic slop configuration window utilized in accordance with the example system shown in FIG. 2.

Referring back to FIG. 3, using the spread configuration window 300, a trader may quickly activate basic slop and input the inside and outside slop parameters at 308 and 310, respectively. Another way to activate basic slop is to select Slop button 338 which will activate the slop configuration window 400 shown in FIG. 4. FIG. 4 is a block diagram illustrating an example basic slop configuration window 400 that can be used to configure basic slop parameters. The basic slop configuration window 400 can be used to define the values for the basic slop parameters, inside and outside slop, using fields 402 and 404, respectively. Icons 406 and 408 are used to accept or cancel changes made to the slop configuration window 400.

Figure 5:
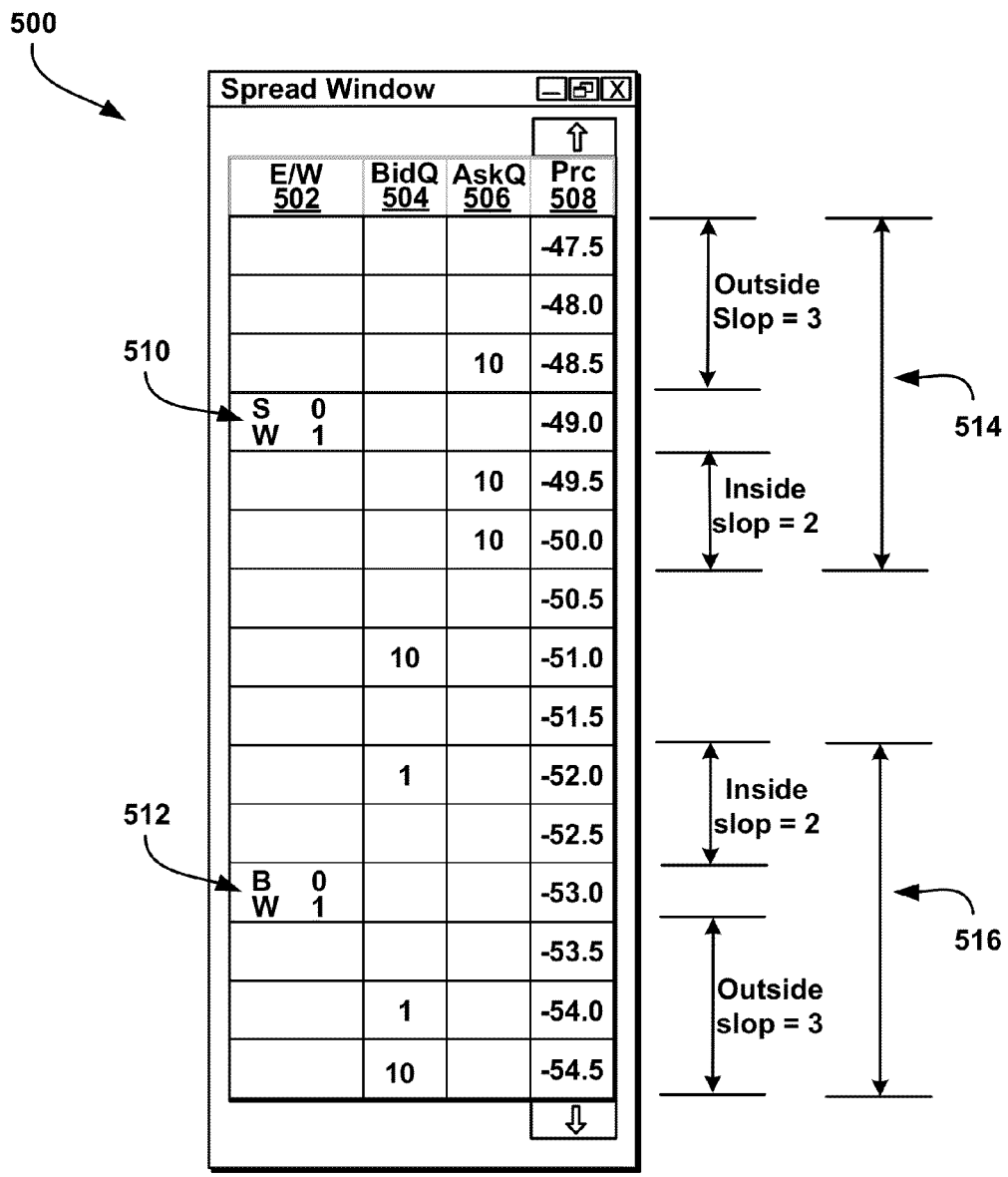
FIG. 5 is a block diagram illustrating an example spread window configured to use basic slop in accordance with the example system shown in FIG. 2.

FIG. 5 is a block diagram illustrating an example spread window 500 configured with basic slop parameters. Spread window 500 displays a working quantity column 502, bid quantity column 504, ask quantity column 506, and price column 508. The working quantity column 502 displays desired orders to buy or sell the spread. The bid quantity column 504 displays buy order quantities associated with the price levels in price column 508. The ask quantity column 506 displays offer order quantities associated with the price levels in price column 508. The price column 508 shows price levels in one tick increments (prices can be positive or negative). It should be understood that the prices levels or tick increments in the price column are statically displayed, that is, they do not normally change positions. The price column is displayed corresponding to the working bid and working ask columns which are dynamically displayed, that is they move up and down to reflect market activity. To assist in understanding how static and dynamic columns work a general description is provided in an already incorporated U.S. Pat. No. 6,772,132, entitled "Click Based Trading with Intuitive Grid Display of Market Depth," filed on Jun. 9, 2000.

Spread window 500 assumes that a trader has desired spread offer order 510 at a price of −49.00 and a desired spread bid order 512 at a price of −53.0. Assuming that this example involves the two leg spread as defined in FIG. 3, the spread bid corresponds to a bid in a first leg and an offer in a second leg. Similarly, the spread offer corresponds to an offer in the first leg and a bid in the second leg. Let's assume that a trader used the slop configuration window 400 of FIG. 4 to set the inside slop value to 2 and the outside slop value to 2. Based on the slop settings, the acceptable slop range for the desired spread offer order 510 would be between −47.5 and −50.0, as shown at 514. Similarly, the acceptable slop range for the desired spread bid order 512 would be between −52.0 and −54.5, as shown at 516. According to this example, the desired spread acceptable range values can be calculated as follows:

For the spread bid: Inner Price=−53.0+2 ticks=−52.0
Outer Price=−53.0−3 ticks=−54.5
For the spread offer: Inner Price=−49.0−2 ticks=−50.0
Outer Price=−49.0+3 ticks=−47.5

V. Visual Representation of Basic Slop

One or more slop ranges may be visually represented in relation to a spread order interface such as spread window 500 shown in FIG. 5. A trader could configure the visual representation of the basic slop parameters via the slop configuration window 400 shown in FIG. 4. After configuring the inside slop and outside slop values, the trader can then select visual indicators to represent the values in relation to the spread window. According to one example embodiment, a trader could select and activate visual indicators to be used in relation to slop parameters via the slop configuration window 400. To do that, a trader could right or left click on each respective field 402 and 404, which may then activate another window or menu defining a plurality of visual indicators that could be used to visually indicate the slop range. Alternatively, another selection icon could be provided in the slop configuration window 400, and the icon could be used to activate another interface that a trader could used to select a visual indicator. It should be understood that a trader may define all or only some of the slop ranges to be visually represented in relation to the spread window. Also, many different embodiments could be used to visually represent a slop range. For example, one or more visual indicators, such as shading, brackets, lines, or two separate indicators corresponding to the highest value and the lowest value of the slop range could be used.

i) Visual Representation of Basic Slop Example

Figure 6:
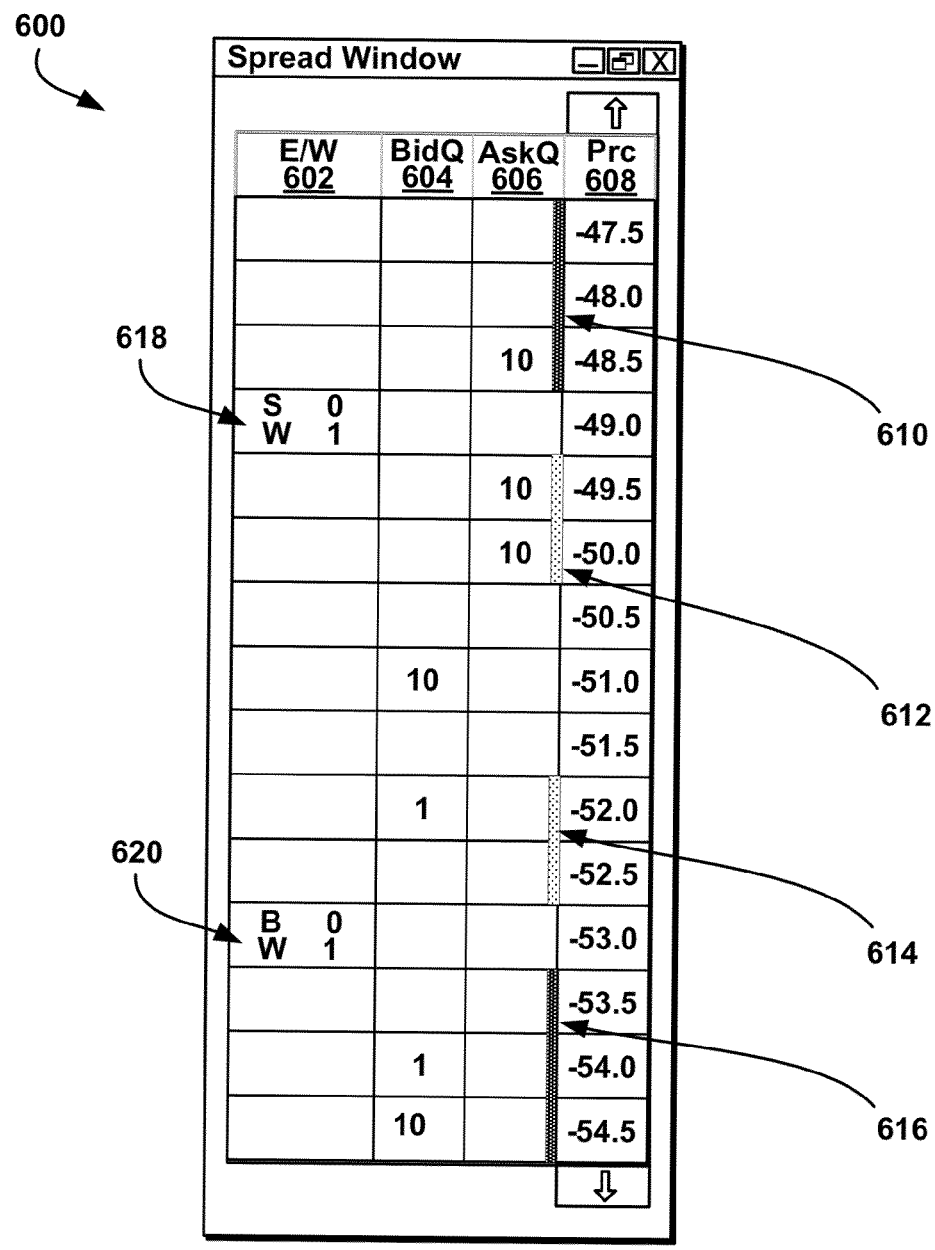
FIG. 6 is a block diagram illustrating an example spread window displaying visual representation of basic slop according to an example embodiment.

FIG. 6 is a block diagram illustrating an example spread window 600 configured to visually represent basic slop parameters. Spread window 600 displays a working quantity column 602, bid quantity column 604, ask quantity column 606, and price column 608. The working quantity column 602 displays desired orders to buy or sell the spread. The bid quantity column 604 displays buy order quantities available in relation to certain price levels in price column 608. The ask quantity column 606 displays offer order quantities available in relation to certain price levels in price column 608. The price column 608 shows price levels in one tick increments (prices can be positive or negative).

Spread window 600 displays example visual indicators, configured using the method previously described, to visually represent the inside and outside slop ranges corresponding to the desired spread orders 618 and 620. Desired spread offer order 618 corresponds to visual indicators 610 and 612. Visual indicator 610 corresponds to the outside slop parameter 404 shown in FIG. 4, which was defined with a value of 3. Visual indicator 612 corresponds to inside slop parameter 402 shown in FIG. 4, which was defined with a value of 2. Similarly, the desired spread bid order 620 corresponds to visual indicators 614 and 616. Visual indicators 614 and 616 correspond to the inside and outside slop parameters 402 and 404 shown in FIG. 4, respectively.

A trader utilizing the configured visual representation in the spread window 600, can visually identify that the desired spread offer order 618 has an outside slop range from −47.5 to −48.5 and an inside slop range from −49.5 to −50.0. Likewise, a trader can visually identify that the desired spread bid order 620 has an inside slop range from −52.0 to −52.5 and an outside slop range from −53.5 to −54.5. As explained above, it should be understood that many different embodiments could be used to display a visual indicator associated with a slop range. The arrangement of the visual indicators shown in FIG. 6 provides one way to display them; however, the present invention is not so limited, as understood by a person skilled in the art.

It is not necessary for the visual indicators to always be displayed. As such, the visual indicators may be displayed when a new desired spread order is entered and/or displayed, such as in the spread window 600. For example, spread window 600 currently displays desired orders 618 and 620 with the corresponding visually represented slop ranges 610, 612, 614, and 616, respectively. If additional orders were entered by a trader, then the spread window 600 would display additional order indicators in the working quantity column 602 and the corresponding slop ranges for each order. Alternatively, the visual indicators can be displayed based on, for example, a trader action, keystroke, audio input, or market event. In addition to visual indicators illustrating a slop range, numerical values that were used to determine the slop range could be displayed as well.

VI. Advanced Slop Overview

Rather than setting a single range of inside and outside slop parameters for each leg of the spread, such as described in the Basic Slop Overview section, with respect to basic slop, a trader could set more than one range of inside and outside slop parameters and adjustable range parameters. The concept of using more than one range of inside and outside slop parameters will be referred to hereinafter as "advanced slop".

According to advanced slop, a trader can define inside slop, outside slop, and adjustable range parameters. An adjustable range is defined as a plurality of ranges, with each range being associated with a set of inside and outside slop parameters. When a spread order is entered at a price level within a defined adjustable range, then a set of inside and outside slop parameters associated with that adjustable range will be used to evaluate whether a leg order should be moved or re-priced to maintain the desired spread order price. Likewise, if a spread order is entered at a price level associated with another adjustable range, then the set of inside and outside slop parameters corresponding to that range will be used to evaluate whether a leg order should be moved or re-priced to maintain the desired spread order price. By using advanced slop, a trader could variably and more flexibly control order entry of trading systems, and in particular, automated or semi-automated trading tools. A more detailed description of re-pricing and advanced slop functionality is provided in an already incorporated in U.S. patent application Ser. No. 10/403,333, filed on Mar. 31, 2003 and entitled "System and Method for Variably Regulating Automatic Order Entry in an Electronic Trading System."

Figure 7:
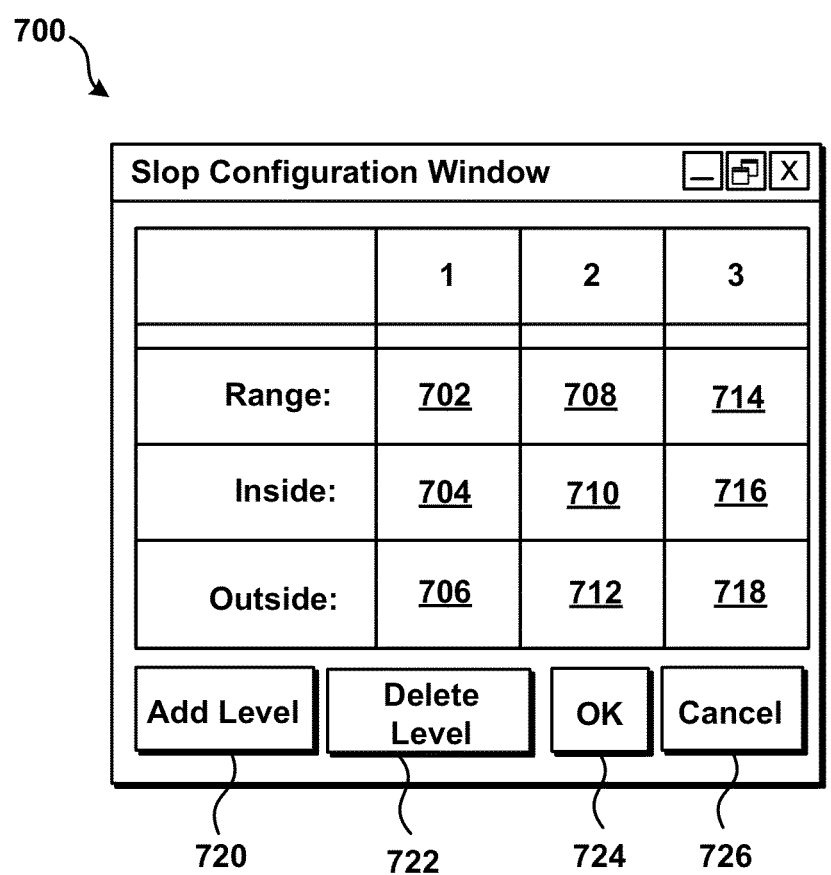
FIG. 7 is a block diagram illustrating an example advanced slop configuration window utilized in accordance with the example system shown in FIG. 2.

FIG. 7 is a block diagram illustrating an example advanced slop configuration window 700 that can be used to configure advanced slop parameters. The advanced slop configuration window 700 can be used to define the values for inside slop, outside slop in relation to a plurality of and one or more adjustable ranges. Slop configuration window 700 displays one example set of parameters that could be defined for advanced slop. In particular, slop configuration window 700 displays three ranges (although one or more ranges may appear, if so programmed) and their corresponding inside slop parameters, outside slop parameters, and adjustable range parameters, although any number of ranges may be configured by the user. The parameters in slop configuration window 700 can be used in relation to both buy spread orders and sell spread orders. However, alternatively, different ranges could be defined for buy and sell spread orders. When a desired spread order falls within a configured range, then that range's inside and outside slop parameters are preferably used to evaluate whether a leg order should be moved or re-priced to maintain the desired spread order price.

According to slop configuration window 700, there are three ranges 702, 708, and 714, although any number of ranges could be defined based on trader preferences. For example, only one range might be used, or only two ranges, or four ranges, and so on. Also, only one inside or outside slop parameter may be used, if so desired. Range 702 has an inside slop parameter and an outside slop parameter that can be specified using fields 704, 706, respectively. Range 708 has inside slop and outside slop parameters that can be specified using fields 710, 712. Then, range 714 has inside slop and outside slop parameters that can be specified using fields 716, 718. If the trader wants to add an additional range, he or she can select icon 720. If the trader wants to delete a range, he or she can select the range and select icon 722. Icons 724 and 726 are used to accept or cancel changes.

Referring to FIG. 7, if a trader wanted the first adjustable range to encompass 4 price levels or ticks from the best bid and best offer, the trader could select the range 1 parameter 702 and enter a value of 0. Then, in the range 2 parameter 708, the trader could enter a value of 4, thus creating the first adjustable range, range 1, $0 \leq X < 4$. Any buy or sell spread order entered in range 1 would then use inside and outside slop parameters 704 and 706, respectively. Alternatively, as mentioned above, different slop values could be defined for buy and sell orders.

A trader may wish to set one or more ranges of inside and outside slop parameters and one or more adjustable ranges. Once the trader has configured one range, slop configuration window 700 shown in FIG. 7 can be used to configure a second range. If the trader wants the second adjustable range to encompass 4 price levels or ticks past the first configured adjustable range, the trader could select the field 714 and enter a value of 8. Entering a value of 8 in the range 3 parameter would thus create the second adjustable range, range 2, 4≤X<8. Any buy or sell spread order entered in range 2 would the use inside and outside slop parameters 710 and 712, respectively.

Since there are only three ranges defined in this example embodiment, the value defined in the field 714 can be used as a starting point of range 3, with range 3 being 8≤X<∞. Any buy or sell spread order entered in range 3 would then use inside and outside slop parameters 716 and 718, respectively.

Alternatively, the ranges could correspond to integer price levels. For example, for any buy spread orders, range 1 might include integer price levels −50, −51, −52, −53, and −54 rather than tick levels used directly above. For any sell spread orders, range 1 might include integer price levels −50, −49, −48, −47, and −46. The example embodiments may utilize any unit of measure to define the ranges and therefore the example embodiments are not limited to the increments used or described herein.

According to one embodiment, the ranges for buy spread orders preferably start from the best offer, and the ranges for the sell spread orders preferably start from the best bid. Moreover, the buy side ranges could start from the best bid or some other designated reference point (e.g., last traded price (LTP), last traded quantity (LTQ), a theoretical price, or some other reference point), and the sell side ranges could start from the best offer or some other designated reference point (e.g., last traded price (LTP), last traded quantity (LTQ), a theoretical price, or some other reference point). Therefore, it should be understood that the example embodiments are not limited to where a range starts and ends or what price levels a range is referenced from.

i) Advanced Slop Example

Figure 8:
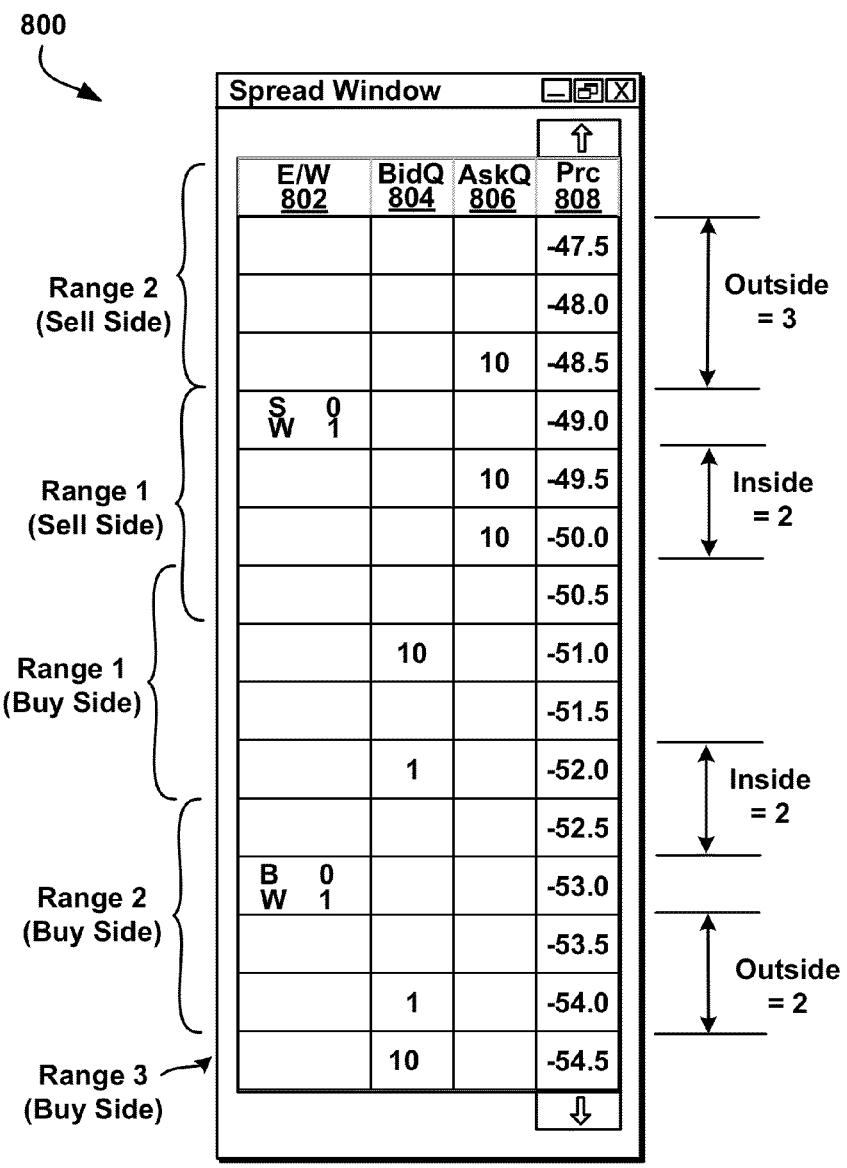
FIG. 8 is a block diagram illustrating an example spread window configured to use advanced slop in accordance with the example system shown in FIG. 2.

FIG. 8 is a block diagram illustrating an example spread window 800 configured for advanced slop. The display 800 shows a working quantity column 802, bid quantity column 804, ask quantity column 806, and price column 808. The working quantity column 802 displays desired orders to buy or sell tradeable objects. The bid quantity column 804 displays bid quantities associated with the price levels in price column 808. The ask quantity column 806 displays ask quantities associated with the price levels in price column 808. The price column 808 shows price levels in one tick increments (prices can be positive or negative).

FIG. 8 shows a plurality of range levels determined based on a slop range definition described in reference to FIG. 7. The ranges are shown using brackets for ease of illustration. As previously described, if a desired spread order price falls within one of the ranges, then the parameters corresponding to that range apply. For any buy spread orders, range 1, 0 X<4 corresponds to price levels or ticks −50.5, −51.0, −51.5, and −52.0. Note that some other price unit may be used instead of 0.5 increments. Similarly, for any sell spread orders, range 1, 0≤X<4, corresponds to price levels or ticks −50.5, −50.0, −49.5, and −49.0. For any buy spread orders, range 2, 4≤X<8, corresponds to price levels −52.5, −53.0, −53.5, and −54.0. For any sell spread orders, range 2, 4≤X<8, corresponds to price levels −48.5, −48.0, −47.5, and −47.0. For any buy spread orders, range 3, 8≤X<∞, corresponds to price levels −54.5, −55.0, −55.5, −60.0, and so on. For any sell spread orders, range 3, 8≤X<∞, corresponds to price levels −46.5, −46.0, −45.5, −45.0, and so on.

Accordingly, the sell spread order at price −49.0, falls in one of the price levels in range 1. Range 1, as defined in FIG. 7, is associated with the inside slop parameter value of 2 and with the outside slop value of 3. The defined slop values would then be used in relation to the spread order at the price of −49.0. Likewise, the buy spread order at price −53.0, falls in one of the price levels in range 2. Let's assume that a trader also used the slop configuration window 700 of FIG. 7 to set the inside slop value of 2 and outside slop value of 2 in relation to Range 2.

VII. Visual Representation of Advanced Slop

Just as a trader could enable the visual representation of the basic slop ranges, a trader could may also enable the visual representation of the advanced slop. When a trader defines advanced slop parameters, one or more corresponding slop ranges could be visually represented in relation to the automatic spreader interface such as spread window 800 shown in FIG. 8. A trader could activate and configure the visual representation of the advanced slop parameters via the slop configuration window 700 shown in FIG. 7. As described in the previous section, the advanced slop parameters available for trader configuration are inside slop, outside slop, and adjustable range. After configuring the inside slop and outside slop parameters, and the adjustable range parameters, the trader may then specify visual indicators to be used. According to one example embodiment a trader may select and activate visual indicators to be used in relation to slop parameters corresponding to each range via the slop configuration window 700. To do that, a trader could select each respective adjustable range field 702, 708, or 714, such as right or left clicking on each respective field. Likewise, a trader could select inside or outside slop fields 704, 706, 710, 712, 716, or 718 to select and activate visual indictors. The selection of each field could then activate another window or menu defining a plurality of visual indicators that could be selected to visually represent the slop range.

Similarly to the visual indicators used in relation to the basic slop, it should be understood that a trader may define all or only some of the advanced slop ranges to be visually shown in relation to the spread window. It should also be understood that many different embodiments could be used to display an advanced slop range. For example, one or more graphical indicators, such as shading, brackets, lines, or two separate indicators corresponding to the highest value and the lowest value of the slop range could be used.

i) Visual Representation of Advanced Slop Example

Figure 9:
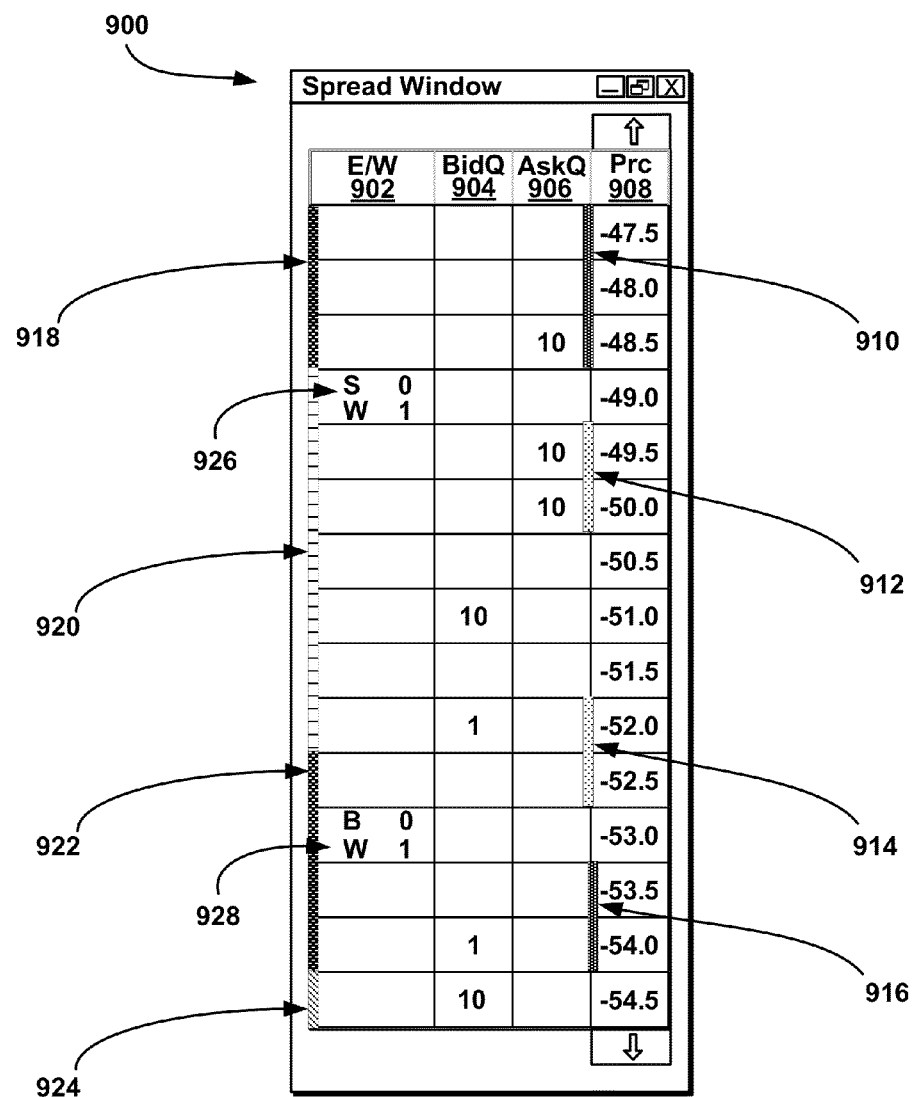
FIG. 9 is a block diagram illustrating an example spread window displaying visual representation of advanced slop according to an example embodiment.

FIG. 9 is a block diagram illustrating an example spread window 900 displaying visual representation of advanced slop. Spread window 900 displays a working quantity column 902, bid quantity column 904, ask quantity column 906, and price column 908. The working quantity column 902 displays desired orders to buy or sell the spread. The bid quantity column 904 displays buy order quantities associated with the price levels in price column 908. The ask quantity column 906 displays offer order quantities associated with the price levels in price column 908. The price column 908 shows price levels in one tick increments (prices can be positive or negative); however, different tick increments could be selected as well.

Spread window 900 also displays example visual indicators, configured using the method previously described, to visually represent the inside and outside slop ranges and the adjustable ranges corresponding to the desired spread orders 926 and 928. Desired spread offer order 926 was entered at price level −49.0 which falls within range 1 as defined in the slop configuration window 700. Since desired spread offer order 926 was entered in range 1, it is associated with inside and outside slop values of 3 and 2, respectively, also defined in slop configuration window 700. Desired spread offer order 926 is located within range 1 which is visually represented by visual indicator 920. The outside and inside slop values corresponding to the spread offer order 926 are shown using an outside slop visual indicator 910 and an inside slop visual indicator 912. Desired spread bid order 928 was entered at price level −53.0 which falls within range 2 as defined in the slop configuration window 700. Since desired spread bid order 928 was entered in range 2, it is associated with inside and outside slop values of 2 and 2, respectively, also defined in slop configuration window 700. Desired spread bid order 928 is located within range 2 which is visually represented by visual indicator 922. The inside and outside slop values corresponding to spread bid order 928 are shown using an inside slop visual indicator 914 and an outside slop visual indicator 916. Although no desired spread order is shown in relation to range 3, range 3 is visually represented by visual indicator 924.

A trader utilizing the configured visual representation shown in the spread window 900, can visually determine that the desired spread offer order 926 has an outside slop range of −47.5 to −48.5 and an inside slop range −49.5 to −50.0. Likewise, a trader can visually determine that the desired spread bid order 928 has an inside slop range of −52.0 to −52.5 and an outside slop range of −53.5 to −54. As explained above, it should be understood that many different embodiments could be used to display a visual indicator associated with a slop range. It should also be understood that the visual indicators can be displayed when a desired spread order is displayed in the spread window 900. For example, spread window 900 currently display desired orders 926 and 928 with the corresponding visually represented slop ranges 910, 912 and 914, 916, respectively. If additional orders were entered by a trader, then the spread window 900 would display additional orders in the working quantity column 902 and the corresponding slop ranges for each order. Alternatively, the visual indicators can be activated based on, for example, a trader action, keystroke, audio input, or market event. It should also be understood that the trader can configured how the ranges can be displayed for example by visual indicators or display values for the ranges.

VIII. Modification of Slop Parameters

In another embodiment, a trader can modify the inside slop, outside slop, or adjustable range parameters from the spread window 900 instead of using slop configuration window 700. To do this a trader can select the visual indicator to either modify the value or to modify the location. For instance, to increase the inside slop value from 2 to 3, a trader could select visual indicator 912 shown in FIG. 9 by selecting the lower edge of the visual indicator and drag it towards the price −50.5. Likewise, to increase the outside slop value of outside slop visual indicator 916 from 2 to 3, a trader could selecting the lower edge of the visual indicator and drag it towards the price −54.5. A trader can also modify an adjustable range parameter by dragging either the top edge or lower edge to either increase or decrease the value. For example, a trader could decrease the range associated visual indicator 920 by selecting either the top edge or the lower edge and dragging it either towards the price −49.5 or −51.5. In this example, selecting either edge would modify the size of the adjustable range. If the trader selected the top edge and dragged it towards the price of −49.5, the adjustable range would change the range from $0 \leq X < 4$ to $0 \leq X < 3$. Modifying the value of one range could automatically modify the values of the adjacent range. For example, if visual indicator 920 was modified as described above, the adjacent range, displayed as visual indicators 918 and 922, would change from having a range of $4 \leq X < 8$ to having a range of $3 \leq X < 8$. As previously described in detail, the example embodiments are not limited to where a range starts and ends or what price levels a range is referenced from. The adjustable ranges for the ask side and the bid side can be independent of each other and could be modified independently of each other.

Additionally, in another embodiment, a trader could set the inside slop, outside slop, or adjustable range parameter from the spread window 900 instead of activating the slop configuration window. Using the same the same technique of dragging as described above, the trader could select the price levels to associate with the inside slop, outside slop or adjustable range parameters. Once the prices levels were selected they could be visually represented as shown in FIG. 9. The trader could then modify the ranges as previously described.

It should be understood that the values associated with the visual indicators can be selected to increase, decrease, or completely modify the position of the inside slop, outside slop, or adjustable range parameters. The ability to modify the inside slop, outside slop, and adjustable range parameters from the spread window 900 allows a trader to more efficiently monitor their desired orders without the need to activate an additional screen to change parameters that are currently in use.

IX. Visual Representation of Effective Spread Price

As shown in relation to the preceding figures, when a trader enters a desired spread order price, the automatic spreader automatically places orders (leg orders) in the appropriate legs to achieve or attempt to achieve the desired spread price. The automatic spreader may, among, other things, calculate the quantities and the prices for the leg orders based on market conditions in the other legs. As the market conditions for each leg move, an effective spread order price may be calculated. The effective spread order price refers to the price where the spread could be achieved if the leg orders were filled at that moment in time.

Using a conventional automated spread trading tool, if the effective spread order price is different from the desired spread order price, then the automated spread trading tool would move or re-price one or more of the leg orders to maintain the desired spread order price. Using slop, while the effective spread order price is within the acceptable range (e.g., such as defined by inside and/or outside slop), then the leg orders are not moved or re-priced. If the effective spread order price falls outside of the acceptable range, then one or more leg orders are moved or re-priced to maintain the desired spread order price.

The automatic spreader displays an indicator at the desired spread order price to graphically represent the trader's desired spread price. Additionally, an indicator may be displayed at the effective spread order price to graphically represent the spread price that the trader would get if the leg orders were filled at that moment in time. The indicator may be displayed in the same column or field as the indicator representing the desired spread order price (e.g., distinguished by graphics or color), or alternatively, the effective spread order price indicator may be displayed at some other location.

Without an effective spread order price indicator, once the spread is achieved, the indicator representing the desired spread order price disappears from the spread window, the trader may be left not knowing the achieved spread price. However, with an effective spread order price indicator, it is more likely that the trader will know the achieved spread price. Additionally, the trader can visually compare the effective spread order price indicator with the slop indicators to determine whether the effective spread order price is within the acceptable range of prices.

i) Visual Representation of Effective Spread Price Example

Figure 10:
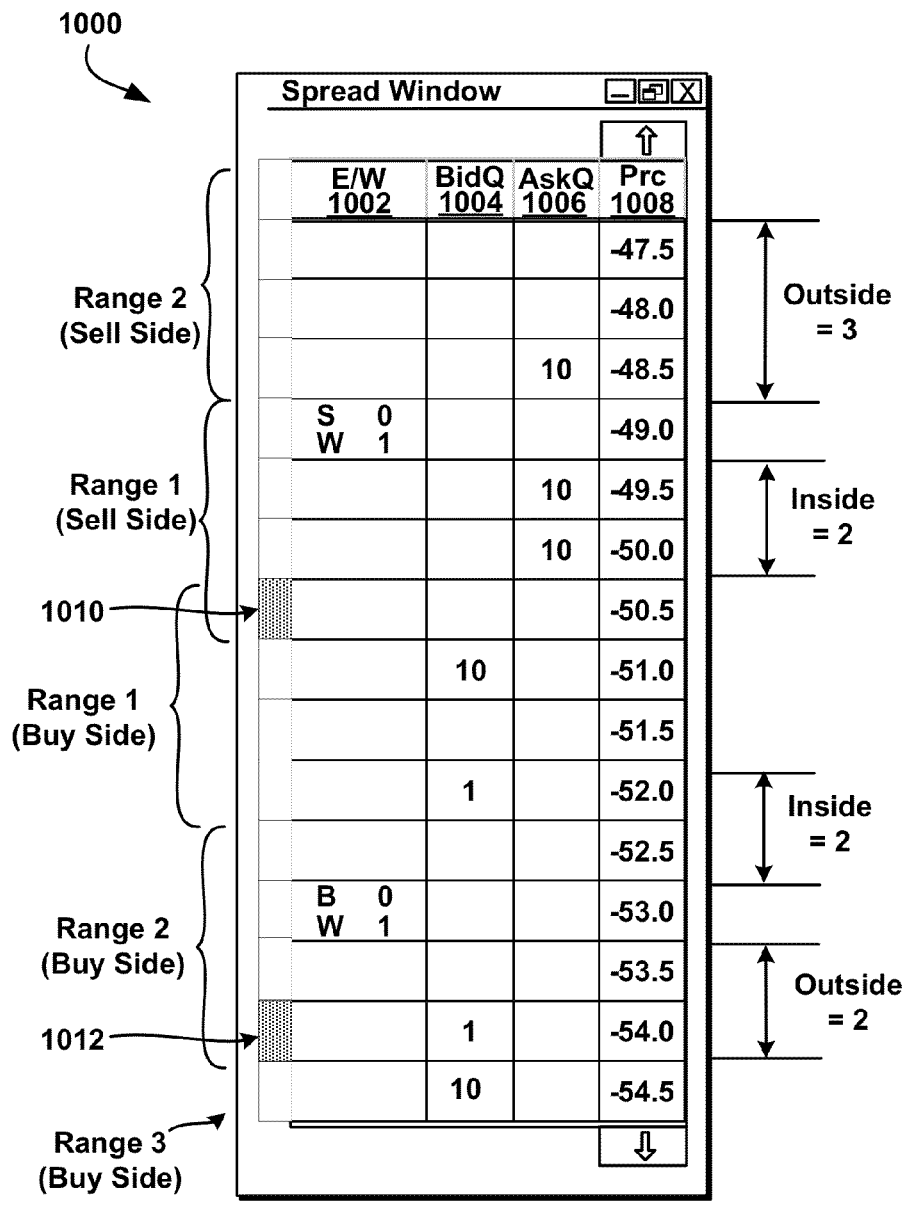
FIG. 10 is a block diagram illustrating a display of a spread window with visual representation of where an order could be re-priced according to another example embodiment.

FIG. 10 is a block diagram illustrating an example display of spread window 1000 that visually represents an effective spread order price icon in relation to a desired spread order price icon. Spread window 1000 displays a working quantity column 1002, bid quantity column 1004, ask quantity column 1006, and price column 1008. The working quantity column 1002 displays desired orders to buy or sell tradeable objects. The bid quantity column 1004 displays buy order quantities associated with the price levels in price column 1008. The ask quantity column 1006 displays offer order quantities associated with the price levels in price column 1008. The price column 1008 shows price levels in one tick increments (prices can be positive or negative).

Window 1000 also displays a desired spread sell order at −49.0 which is located in range 1 and desired spread buy order at −53.0 which is located in range 2. Range 1 and range 2 are determined based on the advanced slop parameters defined in relation to the earlier Figures. The trader has configured range 1 to encompass price levels that would be acceptable for the spread order to be filled at, specifically −49.0, −49.5, −50.0, and −50.5. The trader has also configured range 2 to encompass price levels that would be acceptable for the spread orders to be filled at, specifically −52.5, −53.0, −53.5, or −54.0. Visual indicator 1010 represents the effective spread order price for the desired spread order entered at −49.0. Likewise, visual indicator 1012 represents the effective spread order price of the desired spread order entered at −53.0. The desired spread order price indicators at −49.0 and −53.0 are is still displayed because they have not yet been filled. Let's assume that based on the current market conditions corresponding to the individual legs of the spread, the effective spread order price for desired spread order at −49.0 is −50.5. Likewise, let's assume that based on the current market conditions corresponding to the individual legs of the spread, the effective spread order price for the desired order at −53.0 is −54.0. If the individual leg orders were filled during such market conditions, the desired spread order at −49.0 may be filled at −50.5 instead of −49.0, and the desired spread order entered at −53.0 may be filled at −54.0 instead of −53.0.

It is understood that there are a number of ways to associate the effective spread order price indicator with the desired spread order price indicator. For example, color coding, shading, text, or any other mechanism may associate the indicators so that a trader will preferably know the relationship between the indicators.

X. Visual Representation of Effective Price

In another example embodiment, an effective price indicator could be shown in relation to the effective prices of orders in the individual legs of the spread. Rather than calculating an effective spread order price, the automatic spread could calculate effective prices of orders in each leg of the spread. In particular, as the market conditions for each leg move, the effective prices of orders in the other legs may be calculated such that the desired spread price being sought by the trader can be maintained. Using a conventional automatic spreader, if the effective prices of the leg orders are different from the prices of the leg orders, then the automatic spreader would move or re-price the leg orders. However, in this embodiment, the effective price indicator could visually represent the effective prices of the individual leg orders and where they would be re-priced to maintain the desired spread price.

In another example embodiment, an effective price indicator may also be used when slop is not enabled. When an automatic spreader re-prices a working leg order, the effective price indicator may be used to indicate the price at which the working leg order will be moved. Therefore, if there is some delay in deleting and replacing the working leg order, a trader can visually see before the order is actually re-priced, where the working leg order will be moved. While this is particularly useful when slop is not enabled, it may also be used when slop is enabled especially during those times that the working leg order is actually re-priced (e.g., the effective spread order price indicator falls outside the acceptable range of prices, and the working leg order gets re-priced to maintain the desired spread price).

XI. Conditional Display of Visual Indicators

While some traders may wish to continuously view indicators associated with slop ranges, inside and outside slop, others may want to view them only upon detecting certain conditions. The conditions could take many different formats, including detecting certain user inputs, such as, for example, locating a user input device in certain areas of the trading interface, detecting predetermined keystrokes, audio inputs, or yet some other inputs. According to one example embodiment, to activate some or all indicators, a trader could position a mouse in relation to a desired spread order, which could then activate the display of visual indicators of the inside slop, outside slop, or adjustable range associated with that desired order. It should be understood that the example embodiments are not limited to displaying all visual indicators upon detecting certain user inputs, and a trader could define which indicators the trader wishes to view.

XII. Alerts

Figure 11:
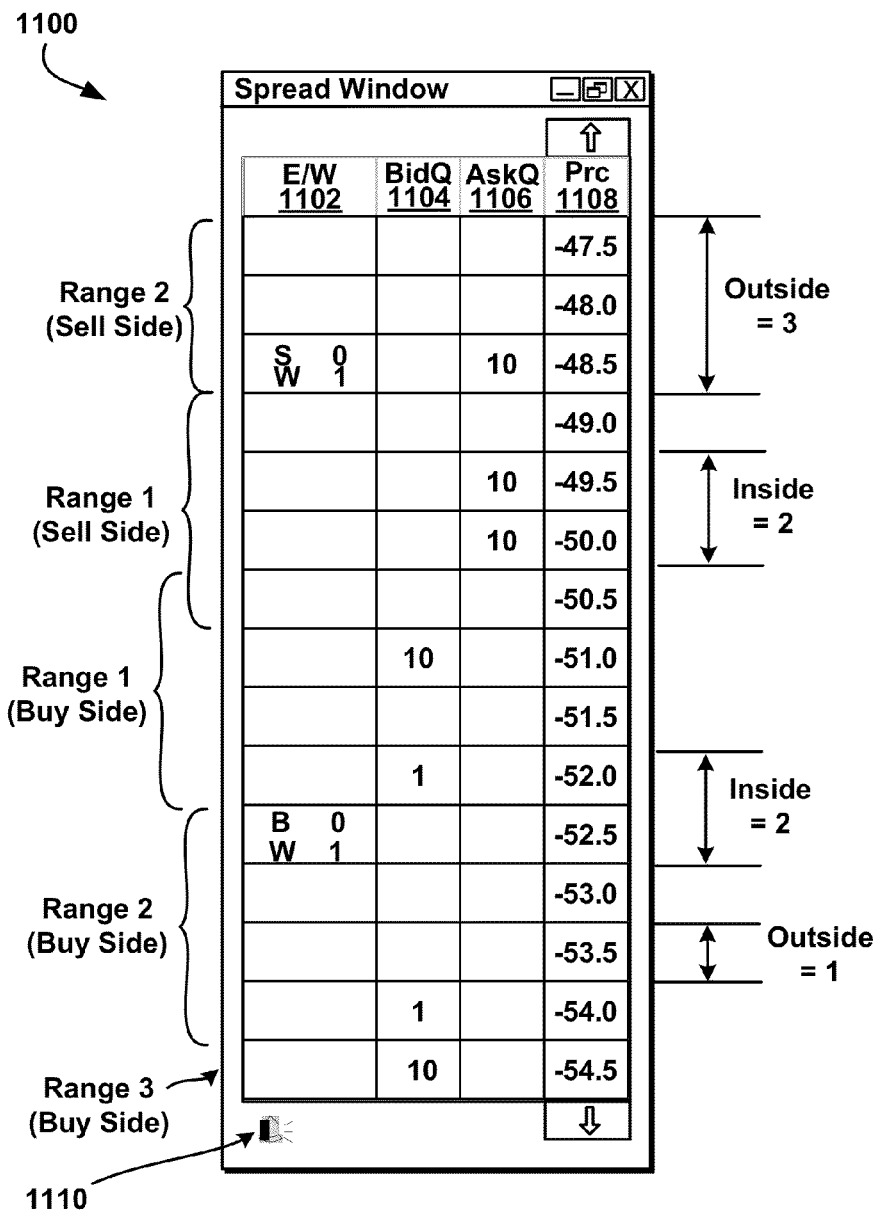
FIG. 11 is a block diagram illustrating a spread market window displaying an alert icon.

In another example embodiment a trader may wish not to view the visual indicators in relation to a spread trading interface, such as spread window 1100 as shown in FIG. 11. Instead, a trader may pre-configure a number of audio alerts with defined sounds to be used in relation to one or more ranges. Alerts can be activated by a trader's desired spread orders moving in and out of the configured acceptable slop ranges. Alternatively, alerts can be activated by an outside source.

In another embodiment, audio alerts can be provided automatically or a trader could manually select an alert icon 1110, as shown in FIG. 11, which could provide an alert indicating whether or not slop is enabled in the specific spread window.

An alternative to an alert sounding when an order moved in or out of an acceptable price range, an alert could sound to notify the trader when changes have been made to the actual inside slop, outside slop, or adjustable range parameters. It should be understood that the present embodiment is not limited to providing any specific alert when changes or movement in relation to inside slop, outside slop or adjustable range parameters occurs. Further, the type of alert can be configurable by the trader.

Conclusion

The above description of the example embodiments, alternative embodiments, and specific examples, are given by way of illustration and should not be viewed as limiting. Also, many changes and modifications within the scope of the present embodiments may be made without departing from the spirit thereof, and the present invention includes such changes and modifications.

It will be apparent to those of ordinary skill in the art that methods involved in the system and method for providing trading information in relation to a plurality of trade levels may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method including:
   displaying by a computing device a plurality of indicator areas, wherein each indicator area corresponds to a price for a trading strategy for trading a plurality of tradeable objects;
   displaying by the computing device an order indicator at an area corresponding to a desired trading strategy price;
   selecting by the computing device one or more indicator areas of the plurality of indicator areas, wherein the selected one or more indicator areas corresponds to prices in a price range, wherein the price range represents a range of prices a user is willing to accept for the trading strategy without re-pricing an order for at least one of the plurality of tradeable objects, wherein the price range is determined based on the desired trading strategy price and a first parameter, wherein the first parameter is associated with a first adjustable price range of a plurality of adjustable price ranges, wherein the first adjustable price range is determined based on the desired trading strategy price; and
   displaying by the computing device one or more indicators, wherein each of the one or more indicators is displayed in the selected one or more indicator areas.

2. The method of claim 1, further including:
   displaying by the computing device a plurality of values, wherein the plurality of values are based on market information relating to the trading strategy, wherein each value in the plurality of values corresponds to a price for the trading strategy, wherein each displayed value is aligned with the indicator area corresponding to the same price.

3. The method of claim 2, wherein the values in the plurality of values are prices for the trading strategy.

4. The method of claim 2, wherein the values in the plurality of values are derived from prices for the trading strategy.

5. The method of claim 2, wherein the plurality of values are arranged in a value axis.

6. The method of claim 5, wherein the value axis is a static value axis.

7. The method of claim 2, wherein the plurality of indicator areas are aligned next to the corresponding displayed values.

8. The method of claim 2, wherein the plurality of indicator areas are aligned at least partially overlapping the corresponding displayed values.

9. The method of claim 1, wherein the trading strategy is a spread.

10. The method of claim 1, wherein the one or more indicators is a single indicator.

11. The method of claim 10, wherein the single indicator is displayed to span the selected one or more indicator areas corresponding to the prices in the price range.

12. The method of claim 10, wherein the single indicator is displayed in the indicator area corresponding to one of the highest price in the price range and the lowest price in the price range.

13. The method of claim 1, wherein the one or more indicators is one indicator displayed in each of the selected one or more indicator areas corresponding to the prices in the price range.

14. The method of claim 1, wherein the one or more indicators is a highest indicator and a lowest indicator, wherein the highest indicator is displayed in the indicator area corresponding to the highest price in the price range, wherein the lowest indicator is displayed in the indicator area corresponding to the lowest price in the price range.

15. The method of claim 1, wherein the first parameter is one of an inside slop parameter, an outside slop parameter, and a slop range parameter.

16. The method of claim 1, further including:
   selecting by the computing device one or more second indicator areas of the plurality of indicator areas, wherein the selected one or more second indicator areas correspond to prices in a second price range, wherein the second price range represents a second range of prices a user is willing to accept for the trading strategy without re-pricing an order for at least one of the plurality of tradeable objects, wherein the second price range is determined based on the desired trading strategy price and a second parameter, wherein the second parameter is associated with the first adjustable price range; and
   displaying by the computing device one or more second indicators, wherein each of the one or more second indicators is displayed in the selected one or more second indicator areas.

17. The method of claim 16, wherein the second parameter is one of an inside slop parameter, an outside slop parameter, and a slop range parameter.

18. The method of claim 16, wherein the first parameter is an inside slop parameter and the second parameter is an outside slop parameter.

19. The method of claim 1, further including:
   receiving by the computing device a command to adjust an indicator;
   determining by the computing device a value for the first parameter based on the received command; and
   updating by the computing device the first parameter to the determined value.

20. The method of claim 19, wherein the command is received from a user input device manipulating the adjusted indicator.

21. The method of claim 20, wherein the command is received from a mouse dragging an edge of the adjusted indicator to another indicator area.

22. The method of claim 20, wherein the command is received from a mouse moving the indicator.

* * * * *